March 5, 1963    J. L. JONES    3,079,918

INTEGRAL VAGINAL APPLICATOR

Filed April 28, 1959

John Leslie Jones
INVENTOR.

3,079,918
INTEGRAL VAGINAL APPLICATOR
John Leslie Jones, 1070 Glen Oaks Blvd.,
Pasadena 2, Calif.
Filed Apr. 28, 1959, Ser. No. 809,441
2 Claims. (Cl. 128—261)

This invention relates to new and useful improvements in a vaginal applicator useful for applying medicament in a vagina.

Included in the objects of my invention are:

First, to provide a hermetically sealed crushable hollow container and closure system located at one end of a paper applicator tube.

Second, to provide an economical crushable hollow container combined with a closure in a vaginal applicator device.

Third, to provide a hermetically sealed crushable hollow container and closure system in a vaginal applicator suitable for long term storage of fluid medicament.

Fourth, to provide a hermetically sealed crushable hollow container and closure system in a vaginal applicator from which the closure is easily removed by the user's fingers.

Fifth, to provide a process for manufacture for a vaginal applicator.

Further objects and advantages of my invention will become apparent in the following description, to be read in connection with the accompanying drawing.

Figure 1:
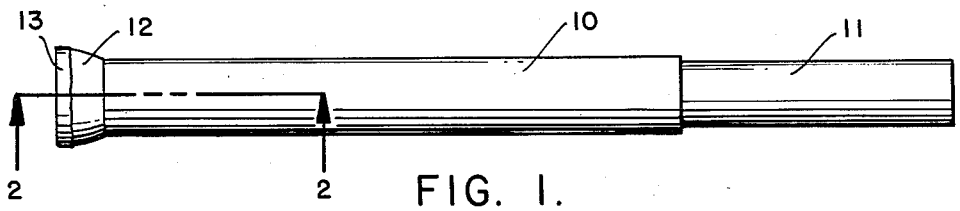
FIGURE 1 is an elevational view of a complete applicator embodying one modification of my invention.

Referring to FIGURE 1 in detail, there is shown a complete, filled integral vaginal applicator of my invention. The medicament storage paper and plastic tube 10 is shown in operating relationship to the paper tube plunger 11. A plastic collar 12 is shown permanently affixed to the storage tube 10 and a foil closure 13 is shown heat sealed to the collar 12 to form a hermetic seal.

Figure 2:
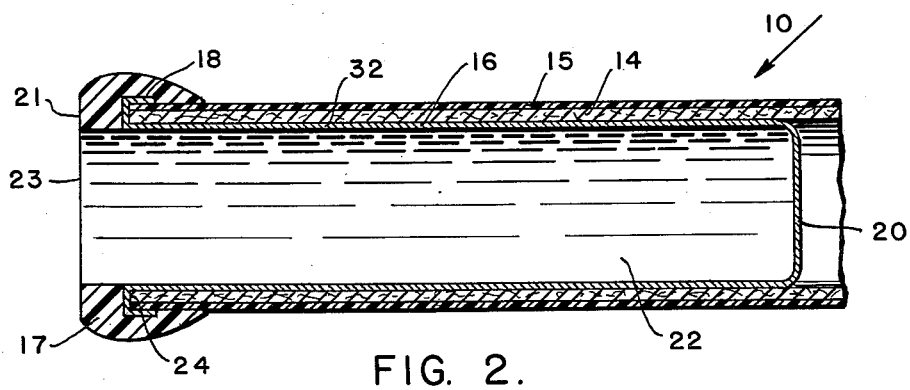
FIGURE 2 is an enlarged partial sectional longitudinal view through 2—2 of FIGURE 1.

Referring to FIGURE 2, the tube 10 is shown in detail to consist of a paper tube base 14 and a plastic overwrap 15 heat bonded to the paper tube stock. The plastic overwrap 15 is not shown in scale since it is normally about 0.001 inch thick. The crushable hollow container 16 is shown in operating position in a close fitting cooperative position with the paper tube base 14. The container 16 has a closed heat sealed bottom 20 and is overlapped over the paper tube end 24 forming a container discharge end. The container 16 is made of material 32 described below. The shaped collar 17 is formed in situ by injection molding in a heat sealed configuration around the tube end 24 and the container lap 18, to form an integral sealed medicament tube. A flat annular ring 21 is formed on the collar to provide a proper sealing area for the heat sealable foil closure 13. The filled medicament tube is shown with medicament 22 discharging at the discharge end 23.

Figure 3:
FIGURE 3 is an enlarged cross sectional view of a laminated foil described in my invention.

To further illustrate the importance of the plastic seal, FIGURE 3 indicates a triple laminate foil 32 useful in forming the crushable hollow container 16. It typically consists of two 0.001 inch thick layers of polyethylene 30 bonded on one face each thereof to the two faces of an aluminum foil 31 layer 0.001 inch thick. Other thicknesses of metal foil, as of aluminum and of tin, may be used, together with other thicknesses of plastic. This type of triple laminate foil is particularly useful in fabricating the crushable hollow container, by forming a simple lap seam, on a mandrel and heat sealing the same.

Figure 4:
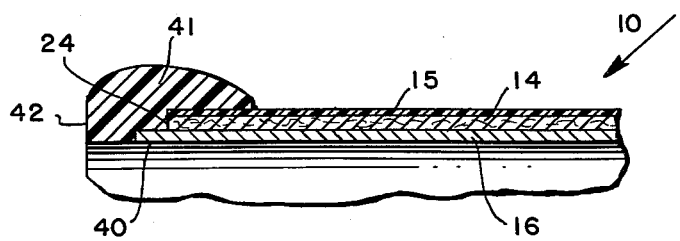
FIGURE 4 is an enlarged partial sectional view of a portion of another modification of my invention.

FIGURE 4 illustrates another form of my invention relating to the modification of heat sealing the crushable bag 16 to the collar 41. The lap 40 of the bag 16 is held in an upright position on the mandrel and the plastic collar 41 is injection molded around the mandrel and lap 40 to form a heat sealed relationship between the collar 41, the lap 40, the tube end 24 and the plastic overwrap 15. A flat annular ring section 42 is formed on the collar 41, to provide a heat-sealable area for a foil seal, not shown.

My closure foil seal 13 may be made from the triple laminate 32 illustrated in FIGURE 3 and discussed above. I prefer to use a thicker metal foil layer 31, than 0.001 inch to provide strength for tearing the seal from the annular ring 21. I may omit one plastic foil layer 30, the exterior plastic layer or uppermost one, from the type of seal 13 since only one plastic layer is used to adhere the metal foil layer to the collar.

Analysis of my invention described above shows that I have devised a hermetically sealed container system in which the collar is integrally bonded to the outer paper tube and to the crushable hollow container to form an integral medicament storage tube, which is in turn hermetically sealed by a laminated foil closure heat sealed to the collar. The combination above is embodied in my integral vaginal applicator.

I use the term plastic to mean the thermoplastics capable of being injection molded or transfer molded or the like for the purpose of forming the plastic collar in situ. Of course, I prefer to use the same thermoplastic for molding as for overwrap on the paper tube. The overwrap on the paper tube is prepared by laminating a thin plastic layer (about 0.001 inch thick) to about 0.002 inch thick paper and then using this thin laminate as the overwrap for the paper tube. To complete a compatible plastic system, I prefer to also use the same plastic to form thin films on both sides of the aluminum or tin foil I use to manufacture the crushable hollow container. Some of the types of thermoplastics which I may use in forming the medicament tube are as follows:

Polyethylene (high density)
Polyethylene (low density)
Poly propylene
Plasticized polyvinyl chloride-vinyl acetate copolymer
Polyvinylidene chloride-vinyl chloride (Saran)
Styrene
Polyethylene terphthalate (Mylar)

Typically, I use a 0.001 inch thick aluminum foil laminated on both sides with 0.001 inch thick polyethylene sheet to form the crushable hollow container. I form the side seam on the container by overlapping the foil on a mandrel to give a $\frac{1}{16}$ inch overlap, and heat-seal the two container layers. The bottom of the container is formed by folding the foil to form a continuous bottom and heat sealing, while on the mandrel. The mandrel is then pushed into the plastic-overwrapped paper tube to sufficient depth to leave a rim of about $\frac{1}{8}$ inch standing above the end of the paper tube. The upright foil rim is pushed down over the outside end of the paper tube to form a coterminous lap over the exterior paper tube end. The coterminous end of the partially fabricated medicament tube is then placed in a plastic mold with the coterminous lap and tube end centered in a mold cavity suitably shaped for a plastic collar. The compatible plastic is injected around the tbue end and the medicament tube removed from the machine after the plastic collar has cooled.

The medicament tube is filled with a fluid medicament and a heat-sealable foil cap is centered and secured to the medicament tube discharge opening by heat-sealing under light pressure.

To use the filled applicator, the edge of the foil closure 13, normally crumpled close to the collar 12, is raised with the fingers and then the foil closure is pulled off the annular ring 21. The tube 10 is inserted in the vagina to the desired depth and the plunger 11 is pushed inward to collapse the hollow container 16 to introduce the medicament 22 into the vagina through the discharge end 23.

It is intended that the integral vaginal applicator be disposable after use of the device, being paper stock, it can be torn up and disposed.

The dimensions of the integral vaginal applicator are proportioned as are necessary for the medicament dosage to be delivered and to the size of the body opening to be treated.

Obviously many modifications and variations of my improvements in integral vaginal applicators are possible in the light of the above teachings. It is therefore understood that within the scope of the appended claims, the invention may be practiced otherwise than as specifically described.

I claim:

1. In a process for manufacturing a single use vaginal applicator outer medicament storage tube, the steps comprising: a first step of forming a container on a mandrel from plastic-foil laminated sheet by overlapping the laminated sheet on a mandrel to form a side seam and folding the foil to form a container bottom; a second step of heat sealing the container seams; a third step of placing a paper tube having two ends over the outside of the container, mounted on the mandrel to a sufficient depth to provide a container rim free above one tube end; a fourth step of folding the container rim down over the outside of said one tube end; a fifth step of placing the mandrel with said container rim and said one tube end in a collar mold; and a sixth step of molding a compatible plastic collar around said one tube end and said container rim under heat and pressure, to form a medicament tube discharge end.

2. In a process for manufacturing a single use vaginal applicator medicament storage tube as in claim 1, the further steps comprising: the removal of said empty storage tube from said mandrel; another step of filling said container with medicament; and the step of heat sealing onto the medicament tube discharge end a foil sheet laminate closure, consisting of a thin compatible plastic layer adjacent said discharge end and a foil layer sealed to said plastic layer.

References Cited in the file of this patent

UNITED STATES PATENTS

| | | |
|---|---|---|
| 1,824,285 | Matson | Sept. 22, 1931 |
| 2,413,480 | Winter | Dec. 31, 1946 |
| 2,478,576 | Fourness | Aug. 9, 1949 |
| 2,503,445 | Lermer | Apr. 11, 1950 |
| 2,691,982 | Jones | Oct. 19, 1954 |
| 2,703,576 | Furr | Mar. 8, 1955 |
| 2,720,881 | Jones | Oct. 18, 1955 |
| 2,739,593 | McLaughlin | Mar. 27, 1956 |
| 2,779,056 | Ligon | Jan. 29, 1957 |
| 2,869,546 | Cantor | Jan. 20, 1959 |